United States Patent [19]
Brown et al.

[11] Patent Number: 5,554,242
[45] Date of Patent: Sep. 10, 1996

[54] METHOD FOR MAKING A MULTI-COMPONENT TIRE

[75] Inventors: Thomas E. Brown, Uniontown; Jon D. Carlson, Medina; Michael W. Cook, Uniontown; Michael Mihalik, St. Marys, all of Ohio; Jack A. Davisson, Luxembourg, Luxembourg

[73] Assignee: The Goodyear Tire & Rubber Company, Akron, Ohio

[21] Appl. No.: 205,053

[22] Filed: Jun. 9, 1988

Related U.S. Application Data

[63] Continuation-in-part of Ser. No. 869,517, May 30, 1986, abandoned.

[51] Int. Cl.⁶ .................................................. B29D 30/06
[52] U.S. Cl. ...................... 156/111; 156/130; 156/130.7; 156/406; 156/406.4
[58] Field of Search .................................. 156/123, 124, 156/111, 110.1, 128.1, 117, 130, 130.7, 133, 394.1, 396, 397, 405.1, 406, 406.4

[56] References Cited

U.S. PATENT DOCUMENTS

| | | |
|---|---|---|
| Re. 25,349 | 3/1963 | Hanson ................................... 156/130 |
| 1,335,879 | 4/1920 | Darrow . |
| 1,918,320 | 7/1933 | Campbell ......................... 156/405.1 X |
| 2,340,040 | 1/1944 | Carlin . |
| 3,455,764 | 7/1969 | Bryant . |
| 3,549,442 | 12/1970 | Hineline ............................... 156/130 X |
| 3,795,563 | 3/1974 | Enders et al. .......................... 156/406 |
| 3,841,941 | 10/1974 | LeBlond et al. ................. 156/405.1 X |
| 3,898,116 | 8/1975 | Katagiri et al. . |
| 4,134,783 | 1/1979 | Appleby et al. ........................ 156/396 |
| 4,240,863 | 12/1980 | Vinton ................................. 156/130 X |
| 4,473,425 | 9/1984 | Irie ..................................... 156/111 X |
| 4,783,230 | 11/1988 | Perkins .................................... 156/117 |
| 4,877,468 | 10/1989 | Siegenthaler ........................... 156/111 |

FOREIGN PATENT DOCUMENTS

| | | |
|---|---|---|
| 30004202 | 9/1979 | European Pat. Off. . |
| 17871 | 10/1980 | European Pat. Off. . |
| 1729842 | 6/1973 | Germany . |
| 802898 | 10/1958 | United Kingdom . |

OTHER PUBLICATIONS

Patent Abstracts of Japan, vol. 8, No. 203 (M-326) [1640] 18 Sep. 1984.

*Primary Examiner*—Geoffrey L. Knable
*Attorney, Agent, or Firm*—T. P. Lewandowski

[57] ABSTRACT

A two-stage building method and apparatus for making an uncured tire including winding on shoulder wedge and sidewall components from strip material on a first stage building drum, winding on gum cushion on a band building drum and making up sequential breaker packages for second stage application to the tire.

5 Claims, 11 Drawing Sheets

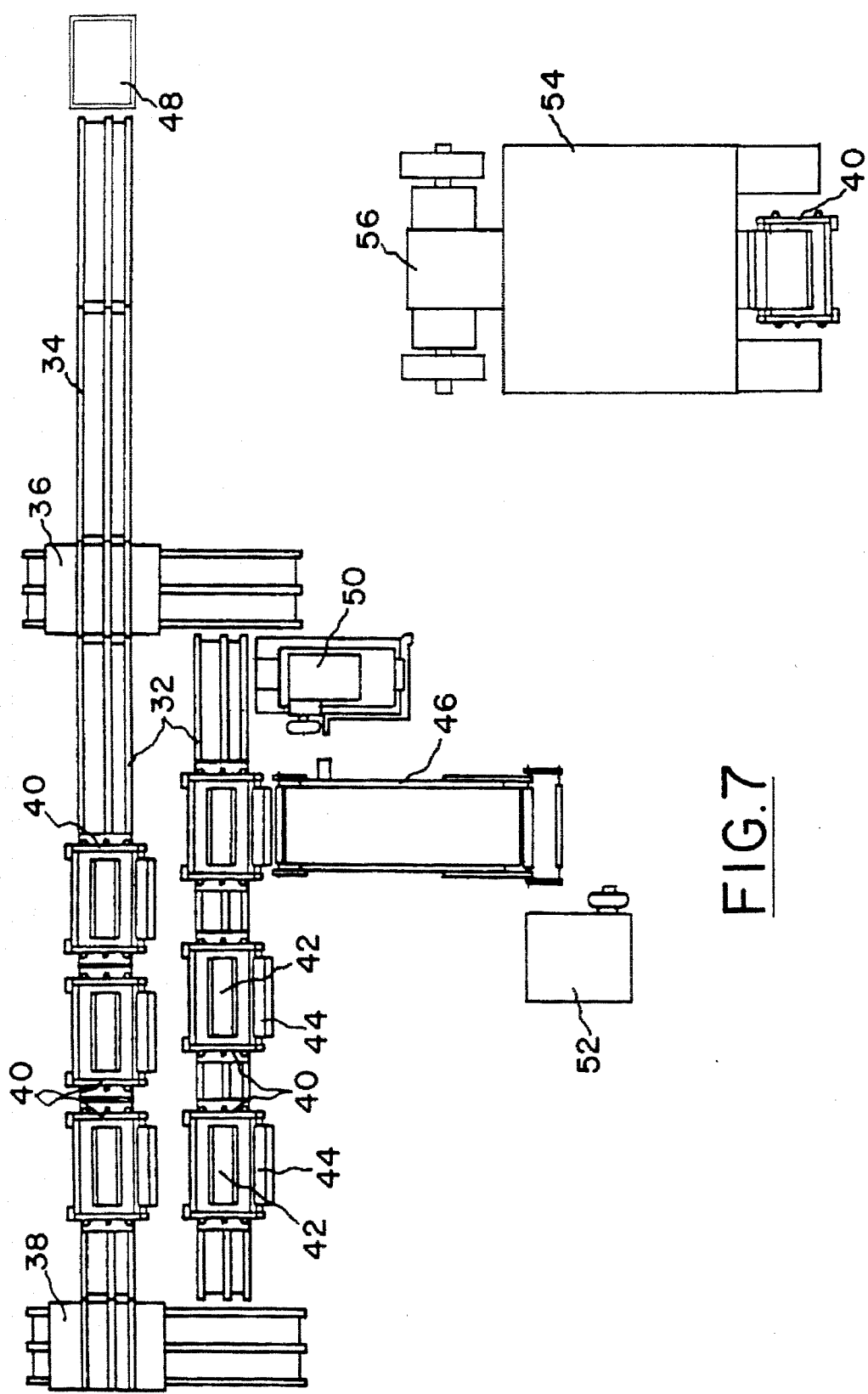

METHOD FOR MAKING A MULTI-COMPONENT TIRE

This is a continuation-in-part of application Ser. No. 869,517 filed on May 30, 1986, now abandoned.

This invention relates to tire manufacture and a system therefor and more particularly to method and apparatus for building tires of multiple components and even more particularly for accomplishing the above in two-stage building without storage of components.

Two stage tire building with a first stage tire building drum in combination with a second stage tire building drum is well known and established in the art with the building drums being both in line and offset from each other. It is further known to have two-stage tire building with a single drum swinging between the first stage position and the second stage position where a band builder is in line with the first stage building drum. For this system, individual breaker application and single piece tread rubber are applied at the second stage while components such as apex chafers and shoulder wedges are applied at the first stage. The above components are made in separate operations and stored for use as needed in the two-stage building process.

It is also well known to use a strip applier to place a continuous strip as by lamination or spiral winding onto a tire to accumulate the necessary rubber for the tire tread. Further it is known to use a particular shape of ribbon for the above process and to use a strip applier for applying sidewall and sidewall scuff rib to the tire from a cold feed extruder supplying the strip to the strip applicator.

While the two-stage building process in its separate stages accommodated servers for the various components, it presented the problems of requiring a large work area for the two separate positions and the need to coordinate the separate functions as well as bringing all of the components together at the proper stations. As a result, the components were often stored and became subject to aging, sometimes losing their tack, for example, during the handling of the individually applied components. Moving the tire subassemblies from one stage to another has been a highly labor intensive operation even with the use of mechanical servers to assist operators in placing the components on the tire on the first and second stage drums. As a result, the operation was costly.

The present system overcomes the above problems by reducing the manual labor replacing it with machine operation to substantially reduce the cost of building a tire by bringing many machine operations for building the tire together in an efficient operation and layout which reduces the space requirement with emphasis on making the tire components as they are needed, and to be applied, to overcome the aging problem while facilitating quick changeover for size and type of tire. Accordingly, the present invention provides a system for building tires having a carcass building station, a breaker station and a tire building station which mechanically functions with the carcass and breaker stations, each of which are mechanized, resulting in automation of tire building; the carcass building station including a solid surface, means for supplying and winding a strip of elastomer onto the solid surface to form a layer of a desired contour; means for supplying an elastomer band for wrapping over the top of the layer formed by the elastomer strip; means for extruding and winding elastomer strip in the form of a tire component from an extruder and applicator onto the elastomer band; the tire building station including a tire building drum capable of expanding the carcass to toroidal shape; means for laminating tread material onto the carcass on the drum; means for translating the carcass by removing it from the carcass building station and placing it on the tire building drum, and expanding the tire carcass; the breaker station including means for cutting finite lengths of various desired materials and widths, and sequencing the finite lengths of material in payoff order for accumulation into a breaker package; means for sequentially supplying the material in the breaker package to form a breaker for a tire; means for conveying the breaker to the tire carcass on the tire building drum; and means for applying the breaker onto the tire carcass. Further, the present invention provides a new and improved method and apparatus for producing tires and a more efficient and compact system. More particularly, method and apparatus is provided for two-stage tire building without storage of components for the tire. The method of making a tire includes making a band for the tire carcass which is formed by adding gum strip to an inner liner which is covered with a ply to form the band which is then transferred to a first tire building position. Sidewall, shoulder wedge, and beads are then added to the first position from which position there is a transfer to a second tire building position. At the second tire building position final shaping of the uncured tire occurs and the addition of breakers and tread rubber is accomplished. The sidewalls and the shoulder wedge rubber are wound on from a continuous source of strip rubber onto the carcass at the first tire building position.

Also contemplated is a method of making a tire where a band thereof forms a carcass by adding gum strip to an inner liner which is covered with a ply to form the band which is then transferred to a first tire building position. At the first tire building position, sidewalls, shoulder wedge and beads are added from which position there is a transfer to a second tire building position for final shaping of the uncured tire. At the second building position breakers and tread rubber are added. A plurality of breakers are maintained in tire building sequence and applied in sequence to the shaped tire at the second tire building position by feeding them automatically through an in-line server.

Apparatus for building a tire includes a band builder for forming the carcass band made by adding gum strip to an inner liner which is covered with a ply. A first stage building drum for adding sidewall, shoulder wedge, and beads to the tire is furnished along with a first transfer device to transfer the band to the first stage building drum. A second stage building drum is furnished for shaping the tire to its final uncured shape and applying breakers and tread rubber to the tire. A second transfer device then transfers the tire from the first stage building drum to the second stage building drum. A breaker server applies the breaker to the second stage building drum and a tread applier applies tread to the second stage building drum while a strip applier is furnished for alternately winding on sidewalls and shoulder wedges to the tire on the first stage building drum.

Also contemplated is apparatus for building a tire including a band builder for forming the carcass band which is made by adding gum strip to an inner liner covered with a ply. A first stage building drum adds sidewall, shoulder wedge, and beads to the tire. A first stage transfer device transfers the band to the first stage building drum. A second stage building drum shapes the tire to its final uncured shape and breakers and tread rubber are applied to the tire on the second stage drum. A second transfer device transfers the tire from the first stage building drum to the second stage building drum and a tread applier applies tread to the second stage building drum while an in-line server automatically applies breakers in sequence to the second stage building drum.

The features of the present invention will be more clearly understood when viewed in conjunction with the accompanying drawings wherein:

FIGS. 2–7 are schematics of the breaker sequence in FIG. 1;

FIG. 8 is a schematic of apparatus for applying the accumulated breakers of FIG. 1 to a second stage building drum;

Figure 1:
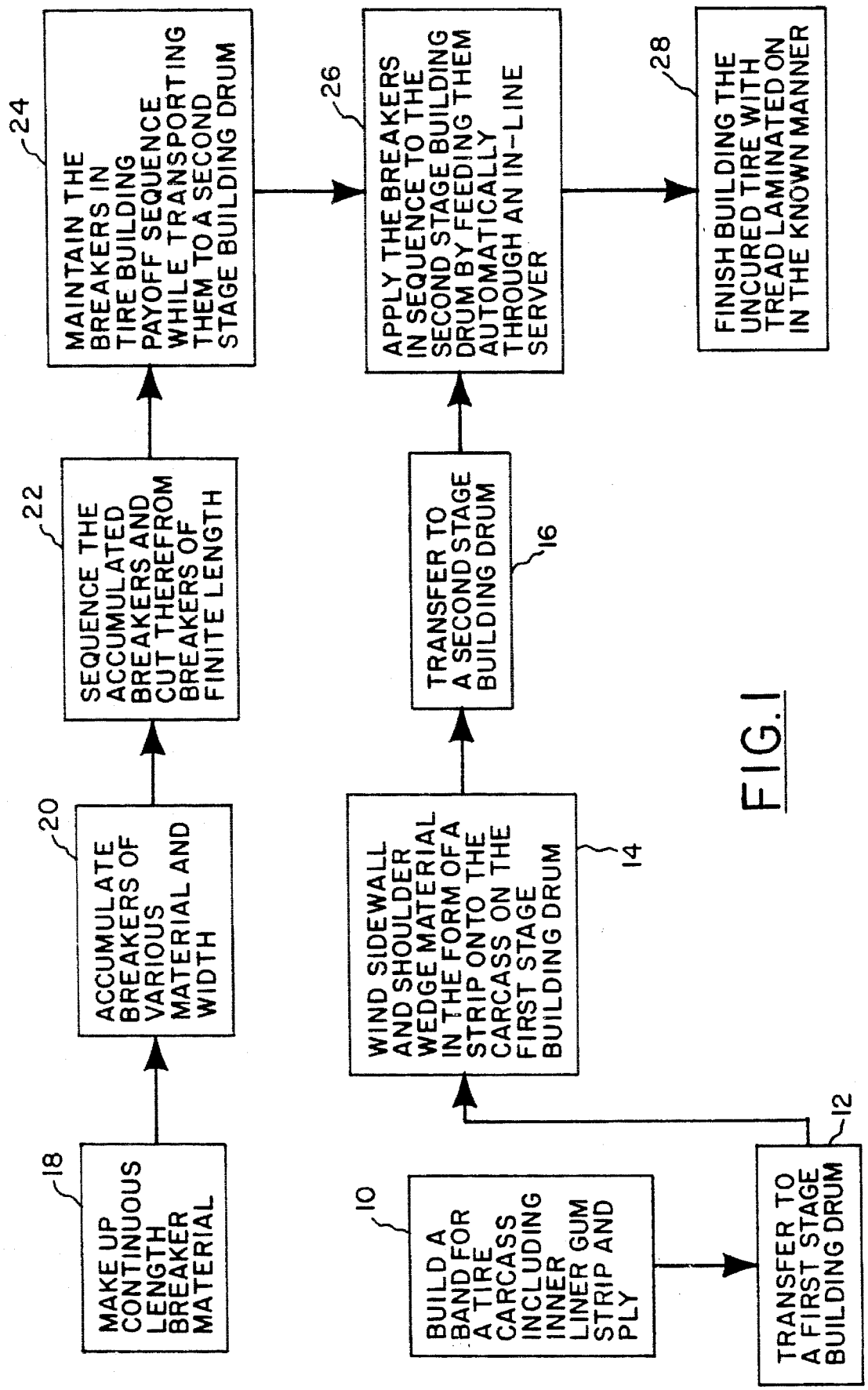
FIG. 1 is a block diagram of a method of building a tire in accordance with the present invention.

Referring now to the drawings, the block diagram of FIG. 1 illustrates a method according to the present invention wherein the steps of blocks 10–16 operate in parallel along with the steps of blocks 18–24, the result of both of which are joined in the step of block 26 to complete the building of an uncured tire in block 28. The steps of blocks 10–16 are directed at the building of a band to form the tire carcass and its subsequent treatment at a first stage building position. The first step is to build a band for a tire carcass including inner liner, gum strip, and a ply. Band building is old and well known in the art and there are a number of ways known to build bands including the use of a belt or a collapsible drum to which is applied the inner liner in the form of a continuous sheet of material generally unreinforced and similarly the ply which is generally reinforced is also applied in the form of a continuous sheet of material, the sheet material being supplied from a calender operation or the like. Preferably in the present invention a solid drum is used for band building and the gum strip added between the inner liner and the ply is strip material which can be wound onto the inner liner in any desired contour. Further an over ply of strip material can be wound on over the top of the ply. A chipper is added in the usual manner.

The portion of the carcass built on the band builder is then transferred to a first stage building drum as indicated by the step in block 12.

At the step illustrated by block 14 the conventional operations of loading beads to the first stage builder and expanding the drum occur while the band is loaded on an expander which is brought in line with the first stage building drum where upon a pull on ring clamps the band and pulls it onto the first stage building drum. The above conventional steps having occurred plus the further conventional steps of swab down and bead set and apex bead stitching, etc., it is preferred to strip laminate shoulder wedges onto the tire carcass. At this point conventional bladder turnup occurs followed by preferably strip laminating on sidewall material after which conventional application of chafer occurs. Finally, the first stage building drum is collapsed and a transfer of the carcass to a second stage building drum occurs as indicated in block 16 of FIG. 1.

A preferred embodiment of band and first stage building will now be described with reference to FIGS. 10–13 illustrating a carcass building station or first stage complex for large tire building. This embodiment is one of three found necessary for building a range of tires from nominal diameter of 24" to 57" where apparatus limitations required different equipment for building size 12.00-24 to 18.00-33 tires, still other equipment for size 21.00-35 to 40.5/75R39 tires and finally the embodiment described below for size 24.00-49 to 4000R57 tires. To make equipment adjustable to build tires over a range larger than those above was found impractical.

Figure 10:
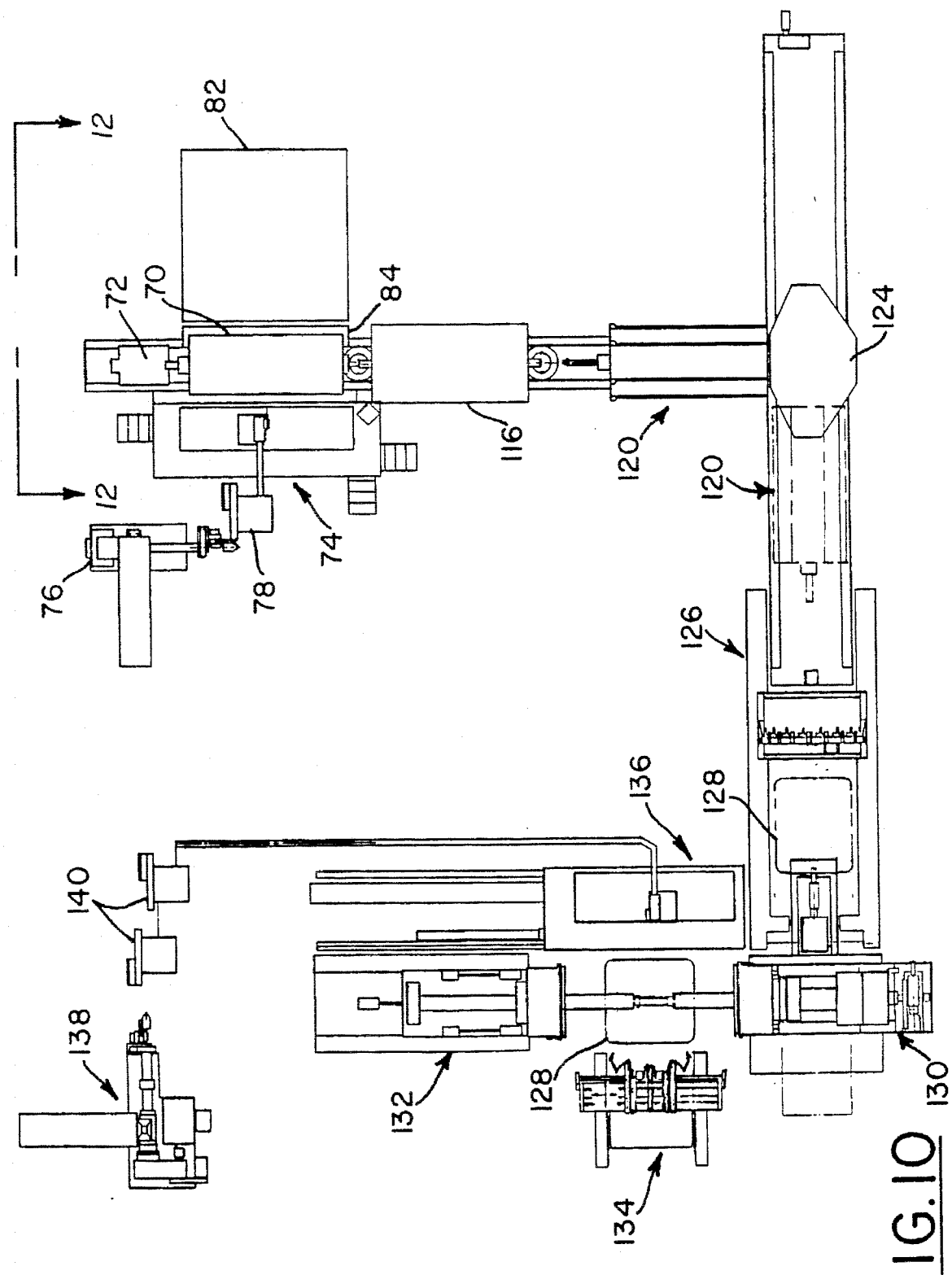
FIG. 10 is a plan view or schematic layout of a first stage complex according to the present invention.

In FIG. 10 a plan view is presented of the carcass building station. Shown thereon are a band building drum 70 having a head stock or main drive 72 for rotating the drum about its cylindrical axis. The drum 70 has a solid surface for band building which is collapsible. Adjacent the drum 70 is a laminator or strip applicator 74 having movement toward the drum 70 and along its surface parallel to the cylindrical axis of the drum 70. Elastomeric strip is supplied to the drum from a 4½" cold feed extruder 76 after passing the strip over cooling drums 78 to present the strip at an acceptable temperature for application to the drum 70.

Figure 11:
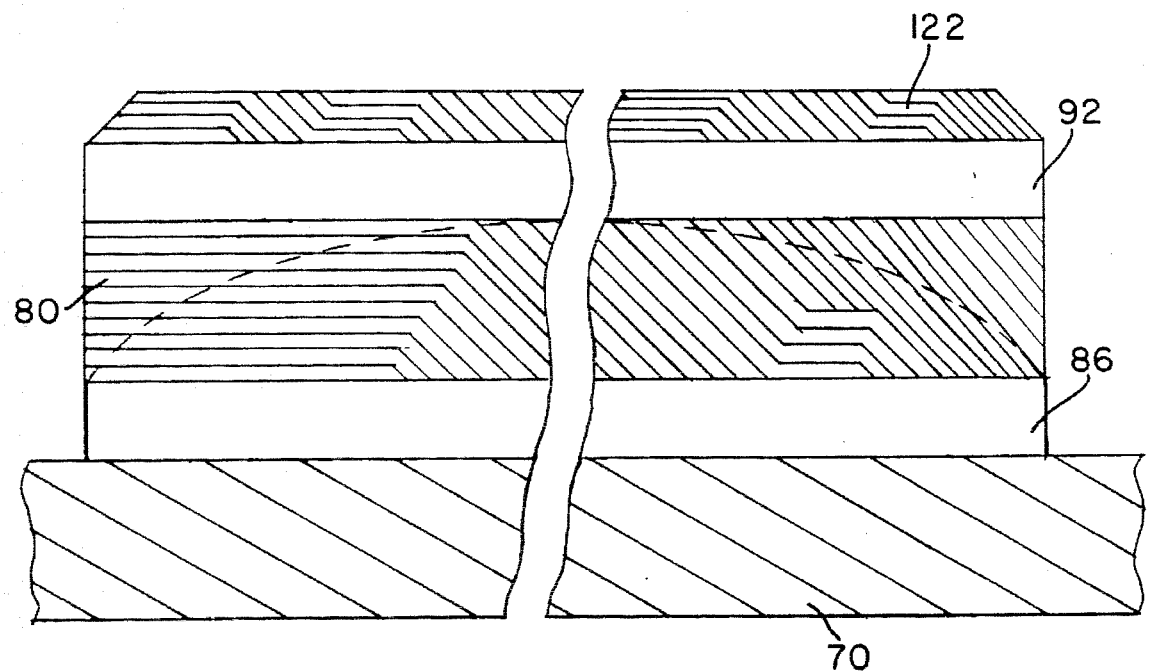
FIG. 11 is a partial section of a band building drum with the center portion broken away and a band thereon.

The strip applying technique is best illustrated in FIG. 11 which schematically presents the laminated barrier or gum cushion layer 80 as being composed of strip material wound onto the drum 70 one pass against another as the drum 70 is rotated about its axis. The strip material may be laid flat and one on top the other or at an angle which may range from flat to vertical; i.e., 90° to the surface of the drum, to thereby facilitate contouring the surface of the gum cushion. While the contour of the gum cushion varies over the length of the drum, the dotted line in FIG. 11 represents generally the distribution over the length of the drum 70 with the greater portion of material being toward the center of the drum 70 surface and lesser portions at the ends and directly at the center (not illustrated).

Also adjacent the drum 70 on the side opposite from the applicator 74 are a server 82 and stitcher 84 shown schematically in FIG. 10. The stitcher 84 is conventional having rollers (not shown) which traverse the surface of the drum 70 to remove trapped air from beneath a component being applied to the drum 70 thereby assuring uniform application of the component to the drum 70. Both a liner and a ply are provided to the drum 70 by the server 82. FIG. 11 best illustrates the liner in layer 86 which may be a single band of material or a band made up of multiple turns of material. Where the layer 86 is particularly wide, the band may be spirally applied over the drum 70 surface in the direction of its cylindrical axis.

Figure 12:
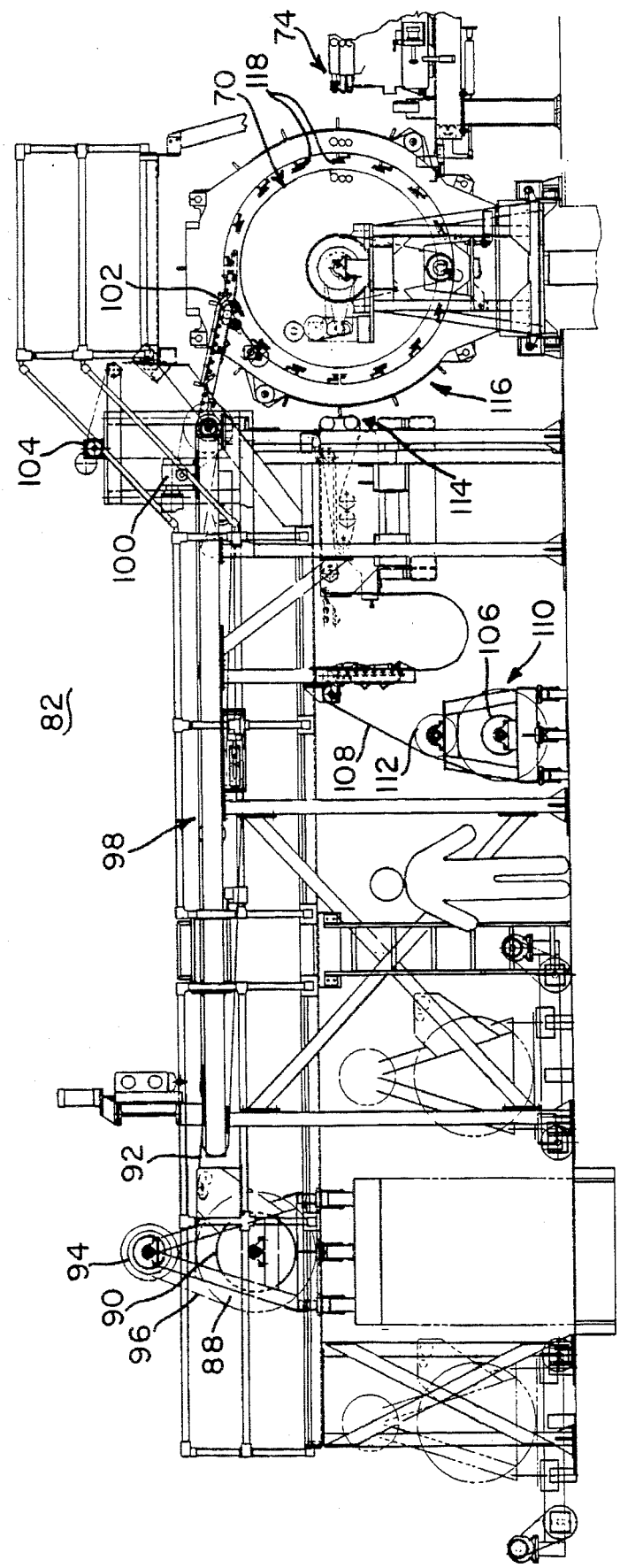
FIG. 12 is an elevational view of a server for the band building drum taken along lines 12—12 of FIG. 10.

The server 82 is best illustrated in FIG. 12 together with a portion of the strip applicator 74. Due to the large size of the drum 70 a superstructure is provided around it and for support of an 'A' frame 88 carrying a spool 90 of material for the tire ply 92 which material is a band of reinforced (such as by cord) material and a take-up roll 94 for collecting a backup liner 96 inserted between the layers of material in the spool 90 to assure their separation. The 'A' frame 88 is shown in an elevated position with two phantom positions as standby and alternate material sources for changeover. The elevated position permits the spool 90 to supply material to the conveyor 98 driven by drive assembly 100 and having a pivotal end portion 102 for generally tangential placement of the ply material onto the surface of the drum 70. Another drive assembly 104 positions the end portion 102 with respect to varying drum diameters. Placing the ply conveyor over the drum 70 permits a spool 106 with tire liner 108 thereon to be placed below the conveyor 98. The spool 106 is carried on a truck 110 and also has a takeup roll 112 similar to the 'A' frame 88. A liner applier 114 is moveable toward and away from the drum 70 to apply the liner 108. FIG. 12 also depicts a band transfer unit 116 for removing the band from the drum 70 by passing over the drum 70 and engaging the band with suction cups 118. As best seen in FIG. 10, the band transfer unit 116 moves between the drum 70 and a band expander 120 onto which the band is deposited.

Returning to FIG. 11, the band built on the solid drum 70 can be seen to be a composite of liner 86, laminated barrier 80, ply 92 and, as an alternative, laminated squeegee or overply 122 which is made up, in the manner described above for the laminated barrier, of strip material which can be layered and/or angled one against the other to form the overply 122. As a further alternative, the liner 86 may be deleted and the ply 92 can be comprised of multiple bands of reinforced material.

Returning to FIG. 10 the band expander 120 can be seen to have a turret 124 for rotating the band expander 120 there about to a position illustrated in phantom wherein it is aligned with a band pull-on 126. The band pull-on is capable of engaging the band, after it has been expanded to its desired diameter on the expander 120, to pull it over a first stage building drum 128, shown in phantom when aligned with the band pull-on 126, by moving transversely between the band expander 120 and the building drum 128. The building drum 128 is supported (in the phantom position) by a headstock 130 mounted on a turret for swinging the building drum 128 from the phantom position to the building position where it is supported by a tailstock 132. A second stitcher 134 is located adjacent the building drum 128 in its building position. Also adjacent the building drum 128 in its building position, but on the opposite side from the second stitcher 134, is a second strip applicator or laminator 136. The strip applicator applies elastomeric strip to the building drum 128 to supplement the band thereon with sidewall and shoulder wedge components which are configured in the same manner as described above for contouring of the gum cushion by the first strip applicator 74. The second strip applicator 136 is fed by a second 6" cold feed extruder 138 after the strip passes over two cooling drums 140.

While in the above example of a first stage complex for larger tire building there are two extruders shown each supplying an individual strip applicator, it would be possible to provide a single extruder to supply both applicators thus the system disclosed, being a preferred embodiment, is not the only way the present system can be practiced.

Simultaneous to the building of the tire carcass in a first stage complex as described for the large tire example above there is a parallel operation going on for making up continuous length breaker material as indicated in block 18 of FIG. 1. Two common ways of making up continuous length breaker material would be by calendering or by extrusion around a reinforcing material. Both of these are well known operations. Preferably, the continuous length breaker material of various elastomers and reinforcements to make up the individual breakers of the tire to be built are accumulated in their various widths as indicated in block 20. Subsequently the accumulated breakers are sequenced preferably by circulating trucks of the material on cars to a cut off where breakers of finite length can be cut from the material in the proper order for which they will have to be paid off to a second stage building drum. This sequence is indicated in the step of block 22.

Block 24 covers the step of maintaining the breakers so cut in the tire building payoff sequence while transporting them to the second stage building drum.

Block 26 illustrates the step of applying the breakers in their proper sequence to the second stage building drum to which now has been transferred the built up tire carcass by feeding the breakers sequentially onto the tire carcass on the second stage building drum through an in-line server. Finally, the tread rubber is added to the tire after having been shaped by expansion of the second stage building drum and preferably the tread material is laminated on in a known manner as indicated in block 28 of FIG. 1.

The above method of making a tire provides for the continuous makeup of breakers and the supply of sidewall and shoulder wedge material as required for the building step in block 26 and first stage building in block 14 in accordance with the demand as it arises eliminating the need for storage of these components. Further the method of making up the breakers allows for quick change of the accumulated breakers without a change of apparatus to accommodate change in size and type of tire.

Figure 2:
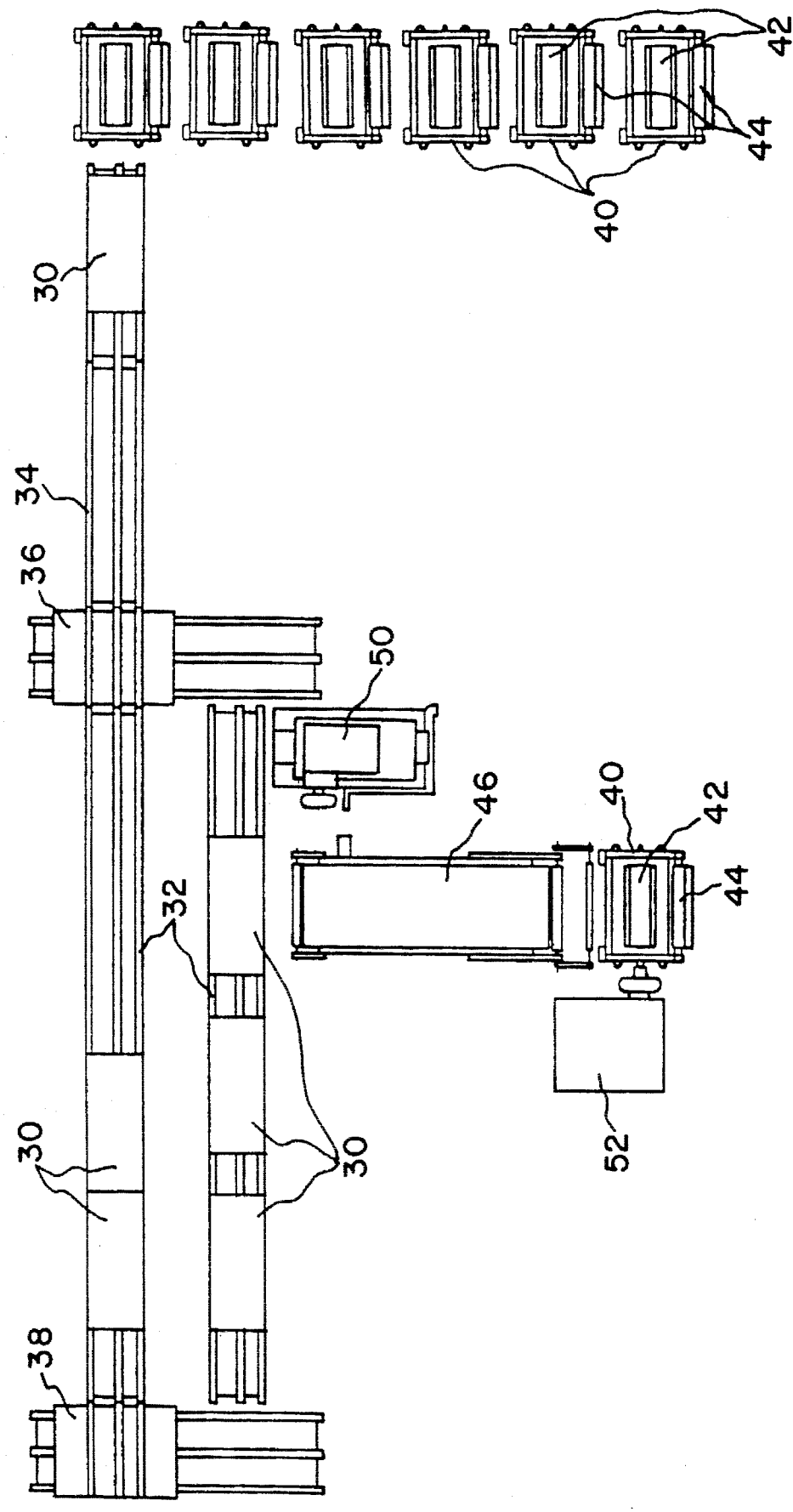
Figure 3:
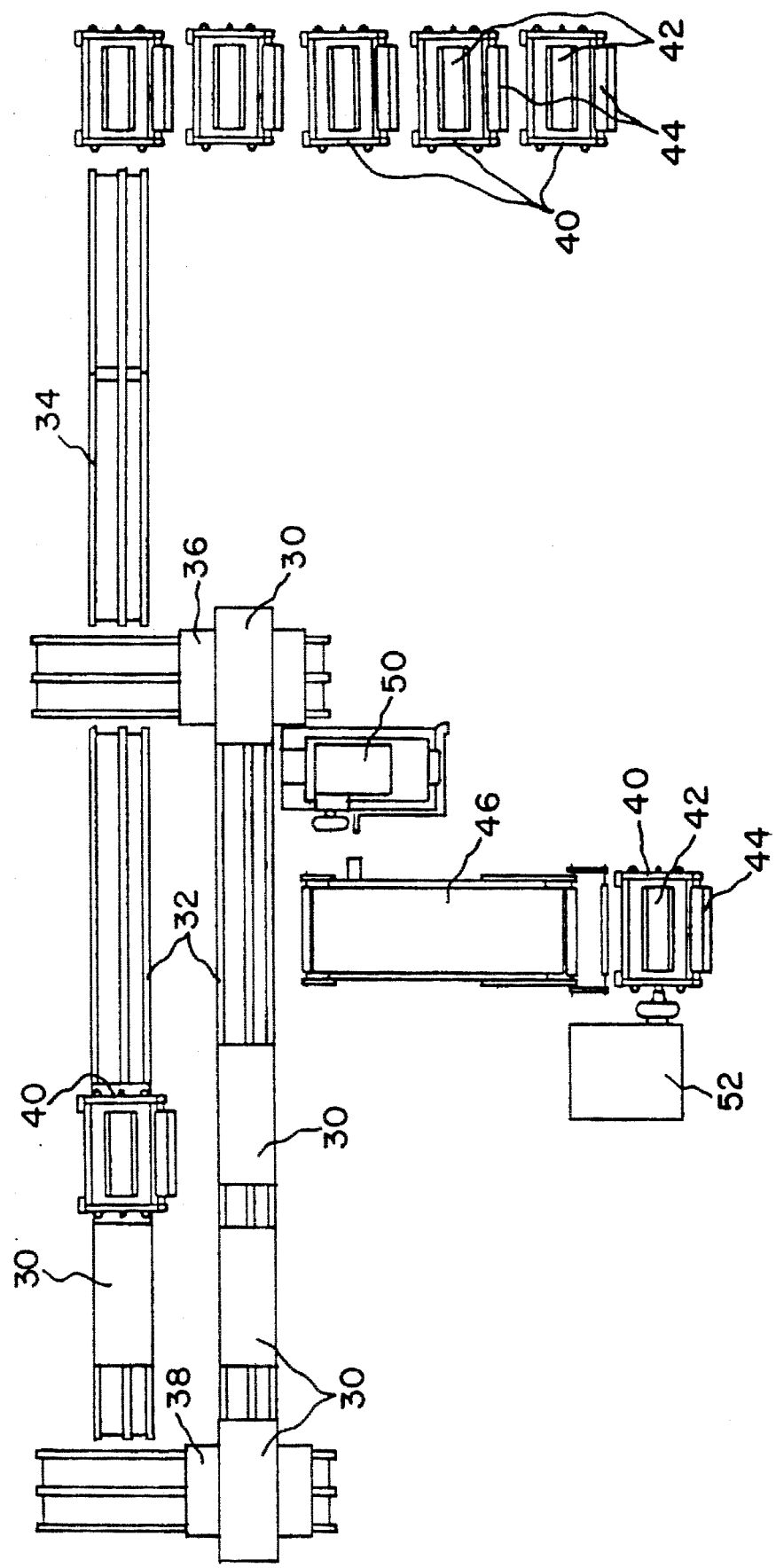
Figure 4:
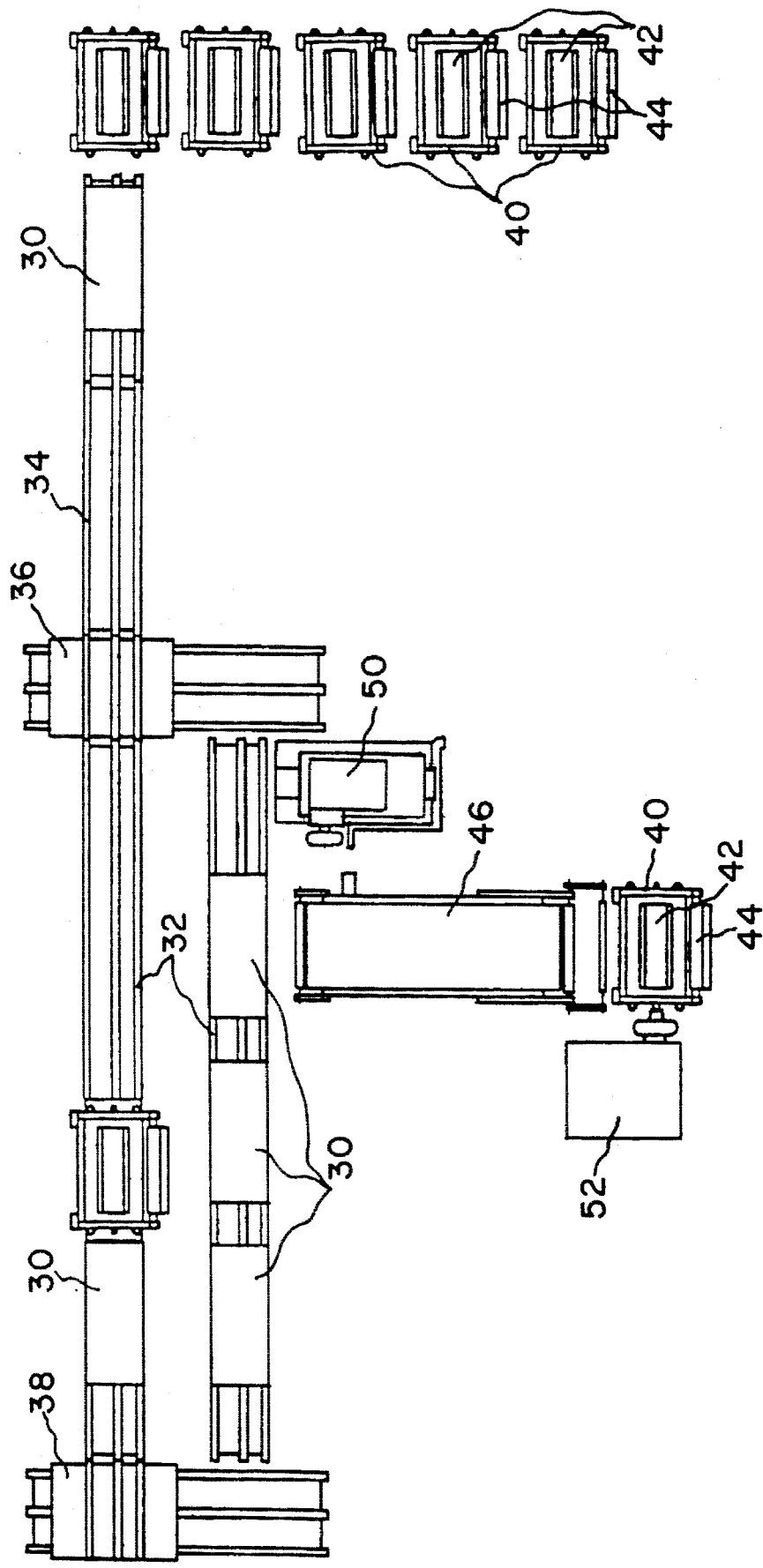
Figure 5:
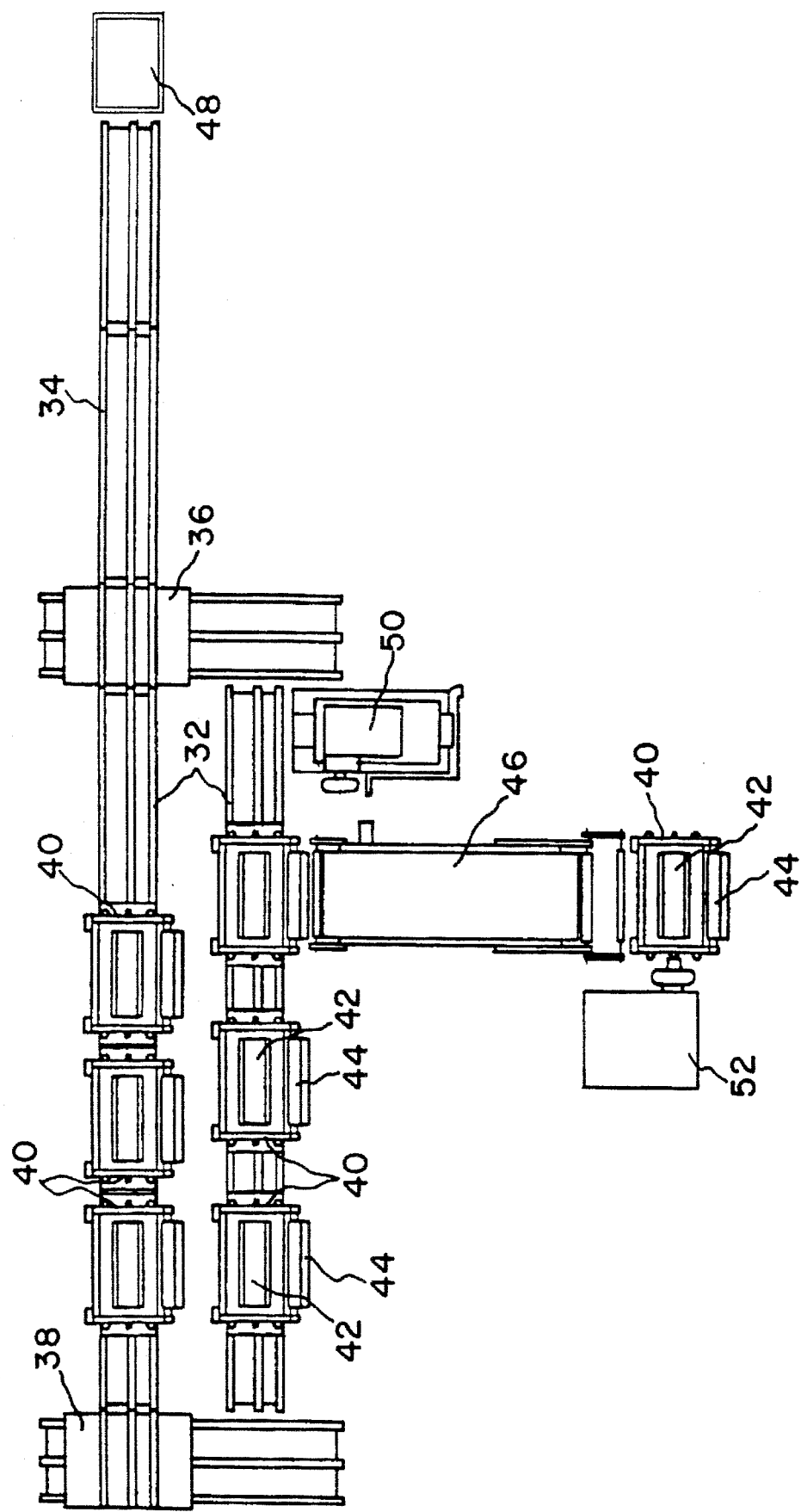
Figure 6:
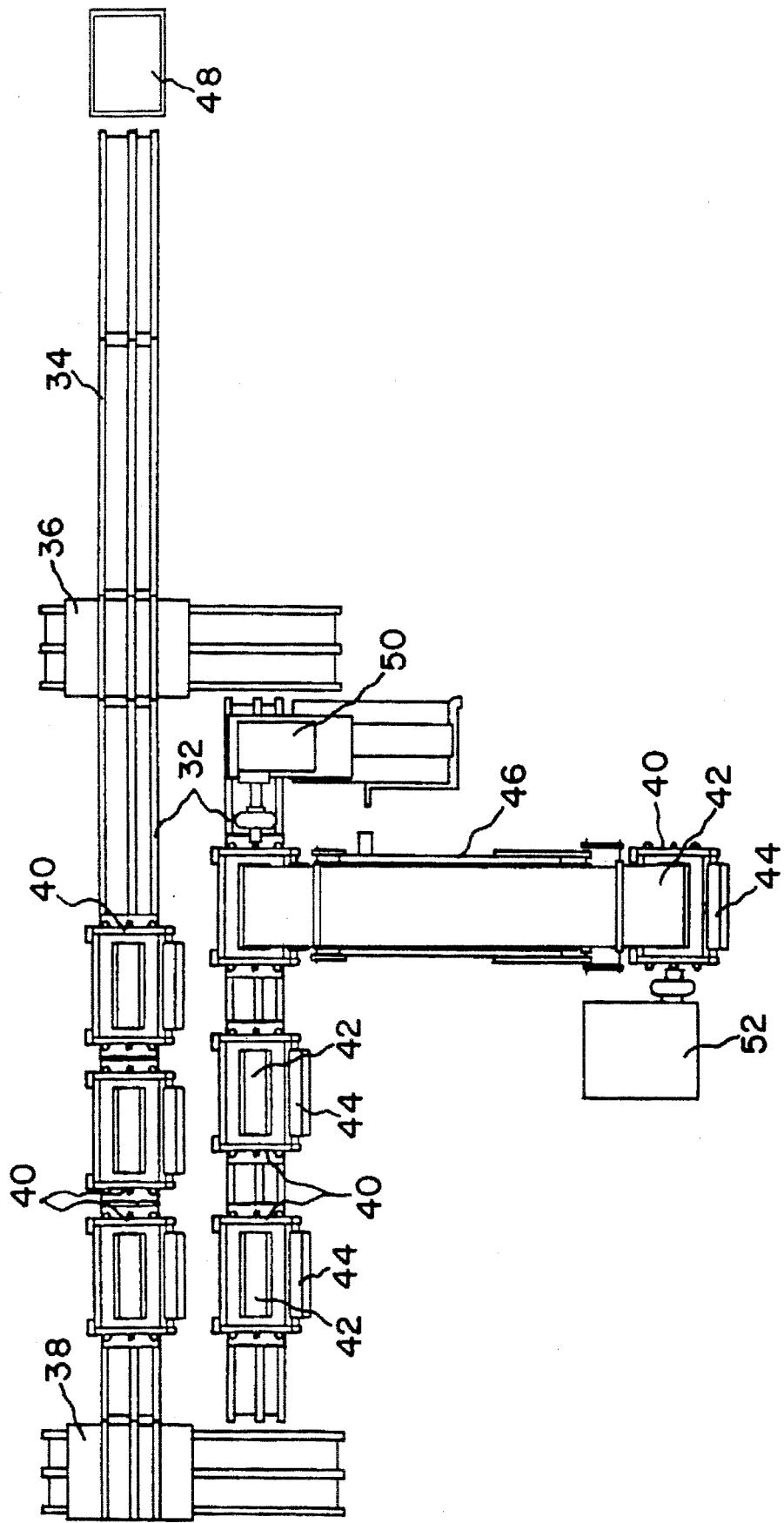

Referring to FIGS. 2–7, apparatus is schematically illustrated for the steps described in FIG. 1 for blocks 18–24. FIG. 2 illustrates a closed loop for moving cars 30 on tracks 32 with one car on the right on an entry track 34. The loop is operative through transfer cars 36 and 38 which cycles the cars between the two tracks 32. The cars 30 accommodate trucks 40 each of which support a roll of breaker material 42 and a stripper roller 44 for accumulating the liner between the breaker material on roll 42. The rolls 42 and 44 are supported on axles which may be driven to rotate the rolls. In addition a truck 40 is also placed at the exit end of a cutoff server 46 to receive breakers from the server 46. FIGS. 3–6 show in sequence how the trucks 40 are loaded onto the cars 30 and sequenced through the closed loop. The car system used is a Cartrac (trademark of SI Handling Systems, Inc.) system, but any similar car system could be used, or in the alternative, an overhead conveyor system could be used to transport the trucks through a closed loop. FIG. 5 illustrates an elevator 48 which elevates the car up into the truck 40 to the level of the cars 30 on the tracks 32,34. In FIG. 6 all of the trucks 40 have been loaded into the closed loop and it is now in condition to repetitively produce finite length breakers in sequence. Drives 50 and 52 for the cutoff server 46 entry and exit end trucks 40 are in position to drive the rolls 42,44 thereon to first supply breaker material from the roll 42 on the entry end which can then be cut off by an operator and advanced to the truck 40 at the exit end which has its roll 42 driven by drive 52 to continuously accumulate the finite length breakers in sequence thereon. As each truck's breaker material is used for a breaker for a particular breaker package for a particular tire, the drive 50 is shifted to the alternate positions indicated in the earlier figures to allow the car 30 carrying the truck 40 to cross over to the transfer car 36. In this manner, the cars 30 are sequentially rotated through the closed loop to bring each car 30 to the cutoff server 46 in proper sequence to cut from each of the rolls 42 on the cars 30 the proper length breaker to make up a package for a particular tire. In the illustrations of FIGS. 2–7, six cars 30 are used for a six breaker package for a single tire. For fewer breakers, fewer cars 30 would be circulated through the closed loop. When a truck 40 is in position in front of the cutoff server 46, the drive 50 moves over toward the truck 40 and engages its axle to enable it to rotate the axle carrying the roll 42 of breaker material on the truck 40. Material is fed from the truck 40 onto the cutoff server 46 and measured to length with a surface drive digital encoder set to stop the server for that particular breaker (not illustrated). Material is cut and the excess wound back up. The next truck 40 moves into position and the next piece of breaker material is cut and sequentially led down the conveyor of the cutoff server 46 to be wound into the roll 42 on the truck 40 at the exit end of the cutoff server 46. The process continues until the supply of breaker material is exhausted at which point loaded trucks 40 are exchanged for the empty ones and an empty truck 40 is installed in the windup position, or the demand for the particular breaker package is met and another set of breaker roll material has to be entered into the system to create the breaker package for the next set of tires.

The cycle for the breaker system is as follows: A full truck of material is brought to the elevator 48 where the car 30 is raised into the truck. A car/truck combination proceeds into the system via a short straight section 34 and a transfer car 36. The car/truck combination would hold in the straight section if another car/truck was on the transfer car 36. Up to five more trucks 40 are loaded in the same way, preferably in proper order. An operator stationed at the cutoff server 46 now has up to six car/truck combinations at his disposal. An empty truck is in the windup position at the exit end of the cutoff server 46. Any time the drive 50 is away from the disengaged position, a limit switch sends a signal preventing a car/truck combination from moving past the material unwind station. The operator pushes the depart station button and if there was a car/truck combination which has just been unloaded it moves out of position. The operator then being satisfied he has the right truck pushes the windup start button and the drive windup moves in and engages the new truck which has moved into position. The operator unwinds stock through a guide underneath a speed control dancer roll and onto the conveyor of the cutoff server 46 using the length measurer. The conveyor stops at the preset length and the stock is cut. When the stock reaches the end of the cutoff server it is fed under another speed control dancer roll along with the liner of the windup truck 40. The operator then pushes the retract stock button which winds up excess material back into the car/truck at the front of the cutoff server. This also causes the drive to disengage and retract. When the drive is fully retracted the operator pushes the depart station button and the car/truck moves by and around the track for another cycle or to the load/unload station if it is empty. The operator would have to indicate this on his control panel if the car/truck combination is to go to the load/unload station. The next car/truck combination moves up and the drive 50 moves back into position to repeat the cycle until the supply of material is exhausted or the plant requirements are fulfilled. When the operator is on his last cycle the trucks in the closed loop should be unloaded as they are finished and a full truck 40 put in its place so that the flow of work is not disturbed. The operator can continue as soon as he replaces the windup truck containing the preassembled breaker package at the exit end of the cutoff server 46. FIG. 7 illustrates the end of a cycle with the truck withdrawn from the end of the cutoff server 46 and the drive 50 shifted ready for transfer of the truck 40 at the entry end of the cutoff server 46 to the transfer car 36 as soon as it is shifted into position. FIG. 8 illustrates the truck 40 taken from the exit position in FIG. 7 in place at the inline server 54 which preferably can take the individual breakers from the breaker package wound on the truck 40 in a line one after the other and place them onto a second stage building drum 56. The server is capable of handling the varying widths and materials as well as lengths of the breakers individually in each package to place the total number of breakers in the package for the tire onto the tire on the second stage building drum 56.

Figure 9:
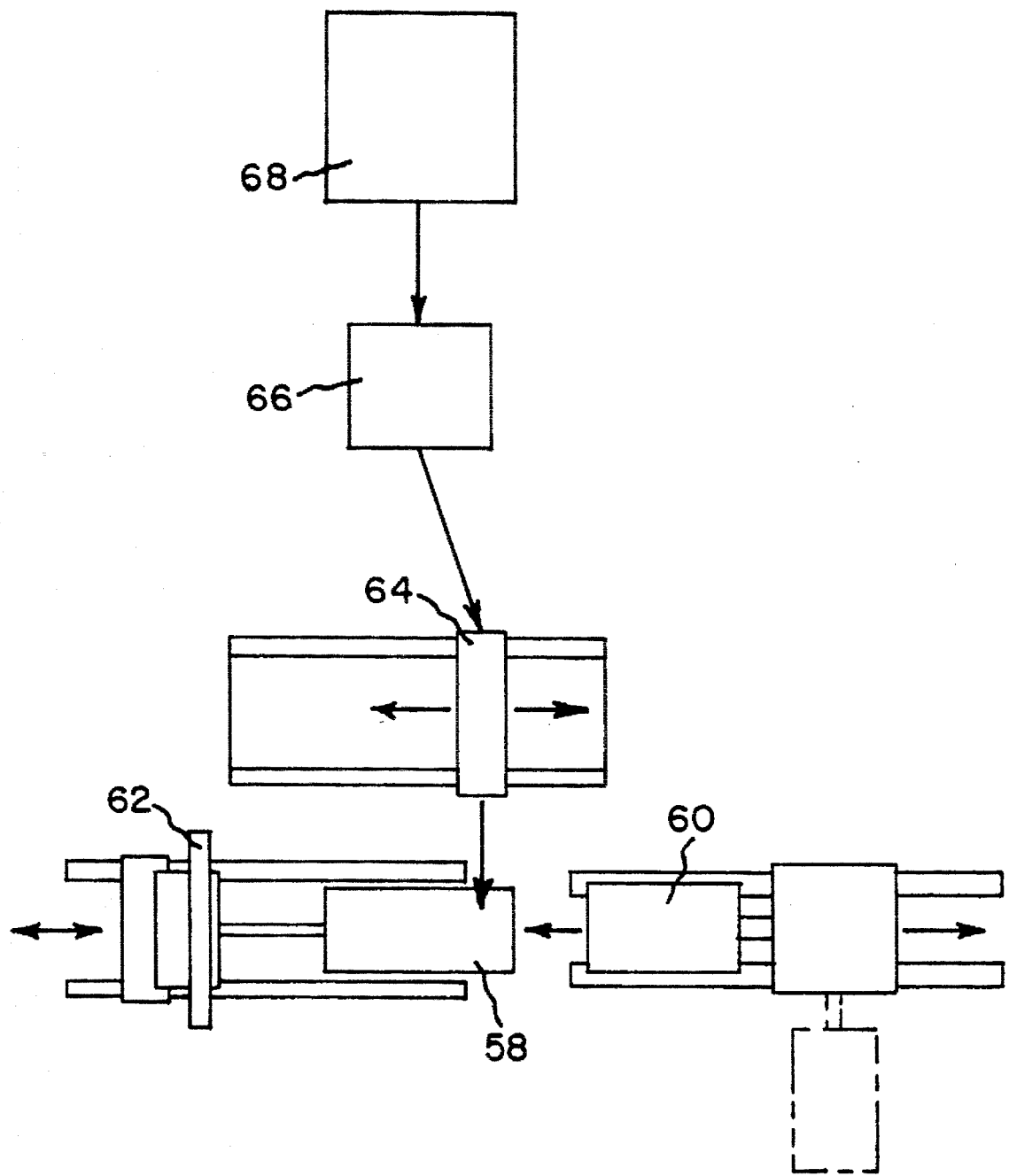
FIG. 9 is a schematic of apparatus for winding on the sidewall and shoulder wedge material of FIG. 1 onto the first stage building drum.

FIG. 9 illustrates apparatus for accomplishing the step of box 14 in FIG. 1 for winding sidewall and shoulder width material in a form of a strip onto the carcass of a first stage building drum 58 a band expander 60 is swingable from a phantom position shown in FIG. 9 in line with the first stage building drum 58 to allow a band pull on 62 to traverse over the first stage building drum 58 and clamp the band on the band expander to thereafter pull the band over the first stage building drum 58. A strip applicator such as that available from AMF is then brought to apply both the sidewall and shoulder wedge material in strip form. The strip is supplied from an extruder 68 which can be either a hot or cold feed extruder, or in the alternative the strip can be supplied from a mill or like type device but preferably a cold feed extruder is used and the strip passes therefrom onto a strip cooler 66 before being applied by the strip applicator 64. In the above manner the strip is applied directly to the tire building operation as it is made up and there is no requirement for storage of components such as sidewall or shoulder wedge.

In accordance with the provisions of the patent statutes the principal and mode of the operation of the apparatus and method have been explained and what is considered to be its best embodiment has been illustrated and described. It should, however, be understood that the invention may be practiced otherwise than as specifically illustrated and described without departing from its spirit or scope.

We claim:

1. In a method of making a tire where a band to make up the tire carcass is formed by adding gum strip to an inner liner which is covered with a ply to form the band which is then transferred to a first tire building position for the addition of sidewall, shoulder wedge and beads from which position there is transfer to a second tire building position for final shaping of the uncured tire and the addition of breakers and tread rubber, the improvement comprising: forming the sidewall and shoulder wedge by applying a plurality of turns of elastomer strip to obtain their shape on the carcass at the first tire building position.

2. The method of claim 1 including the step of placing breakers of finite length in tire building payoff sequence.

3. The method of claim 2 including the step of transporting the breakers of finite length in said sequence to the second tire building position.

4. The method of claim 3 including the step of cutting said finite length breakers from a continuous length of material.

5. The method of claim 4 including the step of sequencing the continuous length breakers in tire building payoff sequence.

* * * * *